United States Patent [19]
Gottberg

[11] Patent Number: 5,914,090
[45] Date of Patent: Jun. 22, 1999

[54] APPARATUS FOR CATALYTIC EXHAUST GAS CLEANING

[75] Inventor: Ingemar Gottberg, Vastra Frolunda, Sweden

[73] Assignee: AB Volvo, Sweden

[21] Appl. No.: 08/849,419

[22] PCT Filed: Nov. 30, 1994

[86] PCT No.: PCT/SE94/01150

§ 371 Date: Aug. 13, 1997

§ 102(e) Date: Aug. 13, 1997

[87] PCT Pub. No.: WO96/17157

PCT Pub. Date: Jun. 6, 1996

[51] Int. Cl.$^6$ ................................................. B01D 53/34
[52] U.S. Cl. ..................... 422/171; 422/174; 422/177; 60/297
[58] Field of Search ..................... 422/171, 169, 422/174, 177, 180; 60/297, 300, 286; 50/DIG. 30; 423/212 R, 212 C, 213.2, 213.7

[56] References Cited

U.S. PATENT DOCUMENTS 5,271,906 12/1993 Yuuki et al. ............................. 422/174

FOREIGN PATENT DOCUMENTS 485179  5/1992  European Pat. Off. .
9214912 9/1992  WIPO .

Primary Examiner—Hien Tran
Attorney, Agent, or Firm—Klarquist Sparkman Campbell Leigh & Whinston

[57] ABSTRACT

An apparatus is provided to achieve enhanced cleaning capacity for exhaust from a motor vehicle, especially during cold starting of the vehicle. The apparatus includes a first catalytic converter, and a hydrocarbon trap located downstream of the first catalytic converter. A second catalytic converter is then located downstream of the hydrocarbon trap. The distance between the first catalytic converter and the hydrocarbon trap is selected so that the period of time that elapses from the start of the engine until desorption occurs in the hydrocarbon trap is greater than or equal to the period of time that elapses from the start of the engine until the first catalytic converter lights up to its normal operating temperature. An electrically heated start converter located upstream of the second catalytic converter is activated when desorption occurs in the hydrocarbon trap.

6 Claims, 1 Drawing Sheet

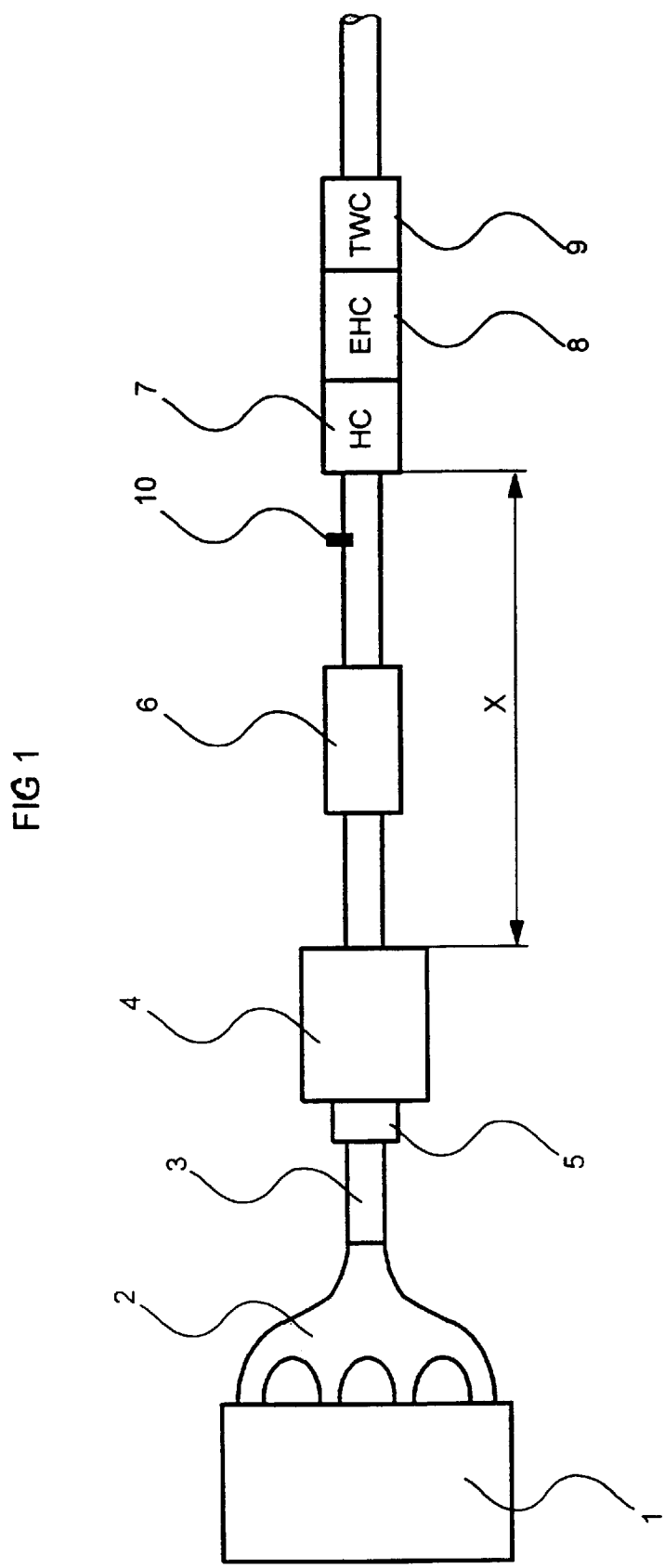

APPARATUS FOR CATALYTIC EXHAUST GAS CLEANING

The present invention refers to an apparatus for catalytic exhaust gas cleaning for an internal-combustion engine, comprising a first catalytic converter located downstream the engine, a hydrocarbon trap arranged at a certain distance from a point directly downstream the first three-way catalytic converter.

Current motor vehicles are often provided with catalytic converters for cleaning the exhaust gas of the vehicle. Normally, current catalytic converters are not able to function with their full cleaning capacity during a cold start of the vehicle. Therefore, such a converter may be supplemented with another electrically heated converter, a so called start converter or a start-up-converter which is located upstream the regular converter. By heating the start converter electrically during start of the engine, the period for warming the regular converter is reduced, which leads to an enhanced cleaning effect. An arrangement of this kind is described in the Swedish patent application 9100541-3.

Of the pollution (primarily HC-, $NO_x$-, and CO-pollution) emitted by an engine, the emission of HC-pollution is especially high directly after engine start. Owing to this, it is known to use a so called "hydrocarbon-trap" which can be located in the exhaust system between the engine and the regular catalytic converter. The hydrocarbon-trap which may be manufactured from a zeolitic material, can adsorb, i.e. "collect", the HC-pollution emitted by the engine until the regular converter has reached its normal operating temperature, and also its full cleaning capacity.

When the temperature in the exhaust stream, and thus also in the hydrocarbon-trap, surpasses a certain limit, the hydrocarbon-trap will emit (desorb) the previously collected HC-compounds. In this way, hazardous HC-compound emissions can be reduced during the heating phase for the following converter, when its temperature is too low to obtain an optimal cleaning function. A conventional three-way catalytic converter may be arranged downstream the hydrocarbon-trap, for elimination of the desorbed HC-compounds.

The invention is especially aimed at a so called "tailpipe catalyst", i.e. an apparatus for catalytic conversion in connection with motor vehicles, which apparatus comprises a conventional three-way catalytic converter in combination with an electrically heated start converter and a hydrocarbon-trap. Such an apparatus is already disclosed in the patent document EP 485179, in which is shown (see FIG. 1(e), and page 5, lines 41–48) an arrangement with a three-way catalytic converter which has been located downstream the engine. The exhausts from the engine are conducted through the converter and further to an electrically heated start converter. Further along downstream in the exhaust system is another three-way catalytic converter arranged.

One drawback with the apparatus according to EP 485179 is that it does not pay regard to the fact that the hydrocarbon-trap must be located in an optimum position with relation to the ordinary catalytic converter, in order to achieve a satisfactory cleaning function in the exhaust system. If the distance between the regular catalytic converter and the hydrocarbon-trap is small, the latter will be heated too rapidly to the limit temperature where desorption starts. Thus, there is a risk of desorption in the hydrocarbon-trap starting before the regular converter has "ignited" (which normally takes about 100 seconds from start of the engine), which in its turn causes that the HC-compounds which thereafter are emitted neither are cleaned by the regular converter nor are adsorbed by the hydrocarbontrap.

If, on the other hand, the distance between the ordinary converter and the hydrocarbon-trap is large, the limit temperature of the hydrocarbon-trap will be reached very late. This can mean that desorption within the hydrocarbon-trap occurs under uncontrollable conditions.

The object of the present invention is to achieve an enhanced cleaning capacity for the exhausts from a motor vehicle, especially in connection with cold starts of the vehicle, by letting a larger amount of pollution be subjected to cleaning during the time when the regular converter still has not reached its normal operating temperature. This is achieved by an apparatus according to the preliminary in that the distance between the first catalytic converter and the hydrocarbon trap is selected so that the period of time that elapses from the starting of the engine until that desorption occurs in the hydrocarbon trap is larger than or equal to the period of time that elapses from the start of the engine and until the first catalytic converter lights up to its normal operating temperature.

FIG. 1 illustrates in schematic form a preferred embodiment of the apparatus of the present invention.

The invention will now be described in the following with reference to a preferred embodiment and the accompanying drawing, in which an apparatus according to the invention is shown. The exhausts from a combustion engine 1 are led via a primary tube 2 to an exhaust pipe 3. A first catalytic converter 4, preferably of conventional three-way type, is connected to the exhaust pipe 3.

The first converter 4 may be provided with a separate electrically heated first start converter 5, which is built around a carrier which is arranged within a metal casing, said carrier acting as a resistive load which can be connected to an (not shown) electric source for heating. A start converter which is suitable for use in the present invention is disclosed in the Swedish patent application No 9100541-3.

The first catalytic converter 4 reaches its normal operating temperature ("light-off temperature"), and accordingly its optimum cleaning capacity, after a certain time $t_{ign}$ has elapsed from the start of the engine 1. Normally, $t_{ign}$ is about 100 seconds.

The exhaust system of the vehicle also comprises a silencer 6 of a conventional design.

Furthermore, a hydrocarbon-trap 7 which comprises a zeolitic adsorbent is arranged in the exhaust system. In connection with the hydrocarbon-trap, there is arranged a second start converter 8 which in accordance with the first start converter 5 is electrically heated by means of a not shown source of current. Downstream the second start converter 8 is a second converter 9 arranged which may be of conventional three-way type or may at least be HC-eliminating.

The hydrocarbon-trap 7 is located at a certain distance x, measured along the extension of the exhaust conduit, from a point immediately downstream the first converter 4. The optimal location of the hydrocarbon-trap 7, i.e. the selection of the distance x, is decided according to what is described in the following with information about how the temperature changes inside the exhaust system after the start of the engine 1. Thus, the exhaust system dimensioned with reference to e.g. volume and length, so that the temperature of the hydrocarbon-trap 7, which rises after start of the engine and heats the converters because of the supply of heat by the exhausts, reaches the temperature when desorption starts first after or at earliest at the same time as the first converter 4 lights off, i.e. reaches active temperature.

When the engine 1 has just been started, and still is cold, the contents of HC-compounds in the exhausts are comparatively large. As the first converter 4 still has not reached its normal operating temperature (which means that the initially emitted amount of HC-compounds will not be eliminated), it is necessary at this moment that the hydrocarbon-trap 7 adsorbs, i.e. "collects", the amount of HC-compounds which are emitted.

After start of the motor 1, the hot exhaust stream will gradually cause an increase in temperature along the exhaust system. When the temperature of the hydrocarbon-trap 7 reaches a certain limit $T_d$, desorption in the hydrocarbon-trap 7 will start. The limit temperature $T_d$ depends both upon material parameters for the hydrocarbon-trap 7, and also upon motor-technical parameters like engine temperature and exhaust flow. The limit temperature $T_d$ is normally about 75° C. The further away from the first converter 4 the hydrocarbon-trap 7 is located (i.e. the higher value of the distance x), the longer time it takes before the hydrocarbon-trap 7 will reach its limit temperature $T_d$.

Thus, desorption starts when a certain time $t_d$ has passed after start of the engine 1, which time $t_d$ is primarily depending upon the limit temperature $T_d$ and the distance x.

When the HC-compounds are beginning to desorb from the hydrocarbon-trap 7, it is necessary that the first converter 4 has reached its normal operating temperature and is able to clean the exhausts which thereafter are emitted by the engine 1. This necessary, because the amount of HC-compounds which thereafter will be emitted by the engine 1 will not be adsorbed by the hydrocarbon-trap 7 (on account of that it already has reached its limit temperature $T_d$).

In order to achieve an optimal location for the hydrocarbon-trap 7, the distance x is selected so that the time $t_{ign}$ that passes from the start of the engine 1 until the first converter 4 reaches its normal operating temperature is substantially equal to the time $t_d$ that passes before the hydrocarbon-trap 7 reaches its limit temperature $T_d$ (provided a certain value on the distance x). In reality, the value of the time $t_d$ may be somewhat higher than $t_{ign}$, because the first converter 4 has already started operating at this point of time.

As described earlier, the hydrocarbon-trap 7 can be located adjacent to a second start converter 8. Nearby this is placed a second catalytic converter 9 which cleans HC-compounds desorbing from the hydrocarbon-trap 7 (as well as other $NO_x$- and CO-pollution) after start of the desorption from the hydrocarbon-trap 7. Therefore, when the hydrocarbon-trap 7 has reached its limit temperature $T_d$, the second catalytic converter 9 must have ignited, or alternatively ignite as soon as possible. In order to register when the hydrocarbon-trap 7 starts to desorb, a temperature sensor 10 can be arranged immediately upstream the hydrocarbon-trap 7, which sensor may consist of a thermocouple, a resistive sensing element or a bimetallic sensing element. The temperature sensor 10 can register the temperature in the exhaust stream and deliver test data in the form of a signal to a (not shown) control unit, preferably in the form of a time relay. This is in its turn connected to the (not shown) source of current, so that the second start converter 8 will be activated when the limit temperature $T_d$ of the hydrocarbon-trap 7 is reached.

The temperature sensor 10 can be located further upstream in the exhaust system than immediately upstream the hydrocarbon-trap 7. In this case, the temperature value at which the temperature sensor 10 shall provide a signal to activate the second start converter 8, should be adjusted to a value which is somewhat higher than the normal limit temperature $T_d$. This compensation is made on account of that the temperature further upstream in the exhaust system normally is higher than immediately upstream the hydrocarbon-trap 7. An advantage with this arrangement is that the temperature sensor 10 does not have to be located directly in connection to the hydrocarbon-trap 7. It is also possible to locate the temperature sensor at a distance upstream the hydrocarbon-trap 7, but it is allotted the same limit value $T_d$ as if it was located adjacent the hydrocarbon-trap 7. One advantage with this is that when the limit temperature $T_d$ has been reached (at the hydrocarbon-trap 7), the second start converter 8 and the second catalytic converter 9 has already been activated, and already operates normally when desorption starts in the hydrocarbon-trap 7.

It is also possible, by way of practical experiments, to determine an estimated value $t_{dd}$ on the time which is expected to pass from the start of the engine 1, until the hydrocarbon-trap 7 is expected to have reached its limit temperature $T_d$. After that this time $t_{dd}$ has elapsed, the second start converter 8 will be activated. In this case, a separate temperature sensor 10 is not necessary.

Finally, an advantageous effect is achieved by the invention with regard to evil-smelling emissions of hydrogen sulphide, which may occur because of chemical binding of sulphur in the motor fuel in a three-way catalytic converter. For example, during maximum throttle accelerations (when fuel mixture delivered to the engine is comparatively rich) hydrogen, which is released in the combustion process, can be combined with sulphur present in the converter and form hydrogen sulphide, $H_2S$. This problem can be solved by the present invention, which accordingly is built up around a "tailpipe catalyst" comprising among other a three-way converter 9. In this second converter 9, the $H_2S$-compounds will be reduced to $SO_2$, which is a much less offensive gas than $H_2S$.

I claim:

1. An apparatus for catalytic exhaust gas cleaning for an internal-combustion engine, comprising:

a first catalytic converter located downstream of the engine;

a hydrocarbon trap arranged a certain distance "x" downstream from a point immediately downstream of the first catalytic converter, the distance "x" being selected so that the period of time "$t_d$" that elapses from the start of the engine until the hydrocarbon trap reaches a temperature at "$T_d$" which desorption of hydrocarbon occurs in the hydrocarbon trap is greater than or equal to the period of time "$t_{ign}$" that elapses from the start of the engine until the first catalytic converter reaches its normal operating temperature; and a second catalytic converter located downstream of the hydrocarbon trap.

2. The apparatus of claim 1, further comprising an electrically heated start converter located downstream of the hydrocarbon trap and upstream of the second catalytic converter, wherein the start converter is arranged to be activated when desorption occurs in the hydrocarbon trap.

3. The apparatus of claim 2, further comprising a temperature sensor located upstream of the hydrocarbon trap, the temperature sensor being arranged to submit a control signal for activation of the start converter when desorption occurs in the hydrocarbon trap.

4. The apparatus of claim 1, further comprising an electrically heated start converter located upstream of the first catalytic converter.

5. The apparatus of claim 2, further comprising an electrically heated start converter located upstream of the first catalytic converter.

6. The apparatus of claim 3, further comprising an electrically heated start converter located upstream of the first catalytic converter.

* * * * *